(12) United States Patent
Hiroshima

(10) Patent No.: US 8,770,368 B2
(45) Date of Patent: Jul. 8, 2014

(54) WET TYPE FRICTION PLATE

(75) Inventor: Tetsu Hiroshima, Yamanashi (JP)

(73) Assignee: Kito Corporation, Yamanashi (JP)

( * ) Notice: Subject to any disclaimer, the term of this patent is extended or adjusted under 35 U.S.C. 154(b) by 735 days.

(21) Appl. No.: 12/678,407

(22) PCT Filed: Sep. 11, 2008

(86) PCT No.: PCT/JP2008/066466
§ 371 (c)(1),
(2), (4) Date: Apr. 28, 2010

(87) PCT Pub. No.: WO2009/041284
PCT Pub. Date: Apr. 2, 2009

(65) Prior Publication Data
US 2010/0206683 A1  Aug. 19, 2010

(30) Foreign Application Priority Data

Sep. 25, 2007 (JP) .................................. 2007-248140

(51) Int. Cl.
*F16D 13/64* (2006.01)
(52) U.S. Cl.
USPC ................ 192/107 M; 192/70.14; 192/107 C
(58) Field of Classification Search
USPC .................................................... 192/107 M
See application file for complete search history.

(56) References Cited

U.S. PATENT DOCUMENTS

| | | | | |
|---|---|---|---|---|
| 1,979,988 A | * | 11/1934 | Munroe | 192/107 M |
| 2,057,954 A | * | 10/1936 | Judd | 192/107 M |
| 2,135,126 A | * | 11/1938 | Harwood | 192/107 M |
| 2,149,324 A | * | 3/1939 | Wales | 192/107 M |
| 3,759,353 A | * | 9/1973 | Marin | 188/71.5 |
| 4,267,912 A | * | 5/1981 | Bauer et al. | 192/53.34 |
| 5,101,953 A | * | 4/1992 | Payvar | 192/107 R |
| 5,776,288 A | * | 7/1998 | Stefanutti et al. | 156/263 |
| RE37,548 E | * | 2/2002 | Hays | 192/70.14 |
| 8,083,046 B2 | * | 12/2011 | Paterra et al. | 192/107 M |
| 2006/0124419 A1 | * | 6/2006 | Kinoshita et al. | 192/3.29 |
| 2007/0151822 A1 | * | 7/2007 | Toya et al. | 192/70.14 |
| 2008/0006504 A1 | * | 1/2008 | Sudau et al. | 192/113.36 |

FOREIGN PATENT DOCUMENTS

| | | |
|---|---|---|
| JP | 61-182430 | 11/1986 |
| JP | 64-18646 | 1/1989 |
| JP | 9-111006 | 4/1997 |
| JP | 10-279923 | 10/1998 |
| JP | 2002-235772 | 8/2002 |
| JP | 2005-330989 | 12/2005 |

OTHER PUBLICATIONS

International Search Report issued Oct. 7, 2008 in corresponding International Application No. PCT/JP2008/066466.

* cited by examiner

*Primary Examiner* — David D Le
*Assistant Examiner* — Ryan Dodd
(74) *Attorney, Agent, or Firm* — Wenderoth, Lind & Ponack, L.L.P.

(57) ABSTRACT

A wet friction plate is constructed such that a carbon based friction material is placed on an outer peripheral side of a friction plate and a paper based friction material is placed on an inside of a carbon based friction material. A transmission torque occupied by the paper based friction material is smaller than that occupied by the carbon based friction material. The wet friction plate can prevent a sudden unexpected slip at low temperature.

1 Claim, 4 Drawing Sheets

(a)    (b)

(c)

WET TYPE FRICTION PLATE

TECHNICAL FIELD

The present invention relates to a wet type friction plate used for a brake such as an electric chain block, an automatic transmission for an automobile and the like. More particularly, the present invention relates to a wet type friction plate equipped with a core plate in a disc shape and a friction member which is pasted and fixed at a predetermined interval in the circumferential direction of the core plate at a plurality of portions.

BACKGROUND ART

Conventionally, as a wet type friction plate used for a brake of an automatic transmission for an automobile, a wet type friction plate is equipped with a core plate in a disc shape and friction members are pasted and fixed at plural portions at a predetermined interval in the circumferential direction of the core plate. The plurality of the friction members uses two or more types of materials whose characteristics are different. (For example, see Patent Document 1).

The wet type friction plate above-mentioned is characterized in that it is higher in friction coefficient, the variation of the friction coefficient is smaller and is excellent in mechanical strength by changing the materials of the members of two types of friction plates when it is compared with a wet type friction plate on which one type of a friction member is alternately provided and fixed.

On the other hand, carbon fiber reinforced plastics (CFRP) are used as a friction member. In the case where the CFRP are used, there is a defect in that "chattering" or "grabbing chatter" is generated at the time when it is quickly stopped from the state where it is driven at low speed revolutions. Therefore, in order to resolve this defect, a friction plate in which "chattering" is prevented by alternately pasting a CFRP and a paper member at a predetermined interval at the same distance from the center of the core plate has been proposed. However, in the case of this friction plate, at a low temperature, it has a problem in that, for example, at the time when an electric chain block winds up a load slightly smaller than the load at which friction clutch works, and it winds down the load, a sudden, unexpected slip occurs.

Patent Document 1: Japanese Patent Application Laid-Open No. 2005-330989

DISCLOSURE OF THE INVENTION

Problem to be Solved by the Invention

As a result of studying the cause why a sudden, unexpected slip is generated at a low temperature, the inventor gained knowledge that because a paper member has a material characteristic where the material is hardened by lowering of the temperature, slip is generated at a lower temperature. The inventor also gained knowledge that even though a paper based friction member has a comparatively high friction force because an oil immersed into the friction boundary surface and pore section is solidified at a lower temperature, when the oil is melted by the friction heat, the friction force is rapidly lowered, and slip is generated.

An object of the present invention is to provide a wet type friction plate in which "chattering" is not generated and a sudden, unexpected slip does not occur at a lower temperature in a wet type friction plate using two types of a CFRP and a paper member having different characteristics as a friction member based on the knowledge described above.

Means for Solving Problem

In order to solve the problem, the present invention provides a wet type friction plate, comprising carbon based friction members that are divided into a plural number of members in a circumferential direction of a friction plate and a paper based friction member, the carbon based friction members and the paper based friction member being pasted and fixed at a predetermined interval. The carbon based friction members are provided on the circumferential side of the friction plate. The paper based friction member is provided on the inner side of it, and a transmission torque occupied by the paper based friction member is smaller than that occupied by the carbon based friction member.

The present invention also provides a wet type friction plate, wherein a ratio of moment arm $r_1$ of the paper based friction member with respect to a sum of the $r\Gamma_1$ and moment arm $r_2$ is in a range from 0.2 to 0.4.

The present invention further provides a wet type friction plate wherein a ratio of area occupied by the paper based friction member with respect to a sum of area of the paper based friction member and the carbon based friction member is in a range from 0.05 to 0.45.

Effects of the Invention

A wet type friction plate of the present invention has heat resistance (which a carbon based friction member has), fatigue resistance and a "chattering" generation prevention characteristic, (which a paper based friction member has), by providing a carbon based friction member on the circumferential side of the friction plate and providing a paper based friction member on the inner side of it. The wet type friction plate of the present invention can prevent the generation of a sudden, unexpected slip at a low temperature by making the transmission torque occupied by the paper based friction member smaller than that occupied by the carbon based friction member.

BEST MODE FOR CARRYING OUT THE INVENTION

Figure 1:
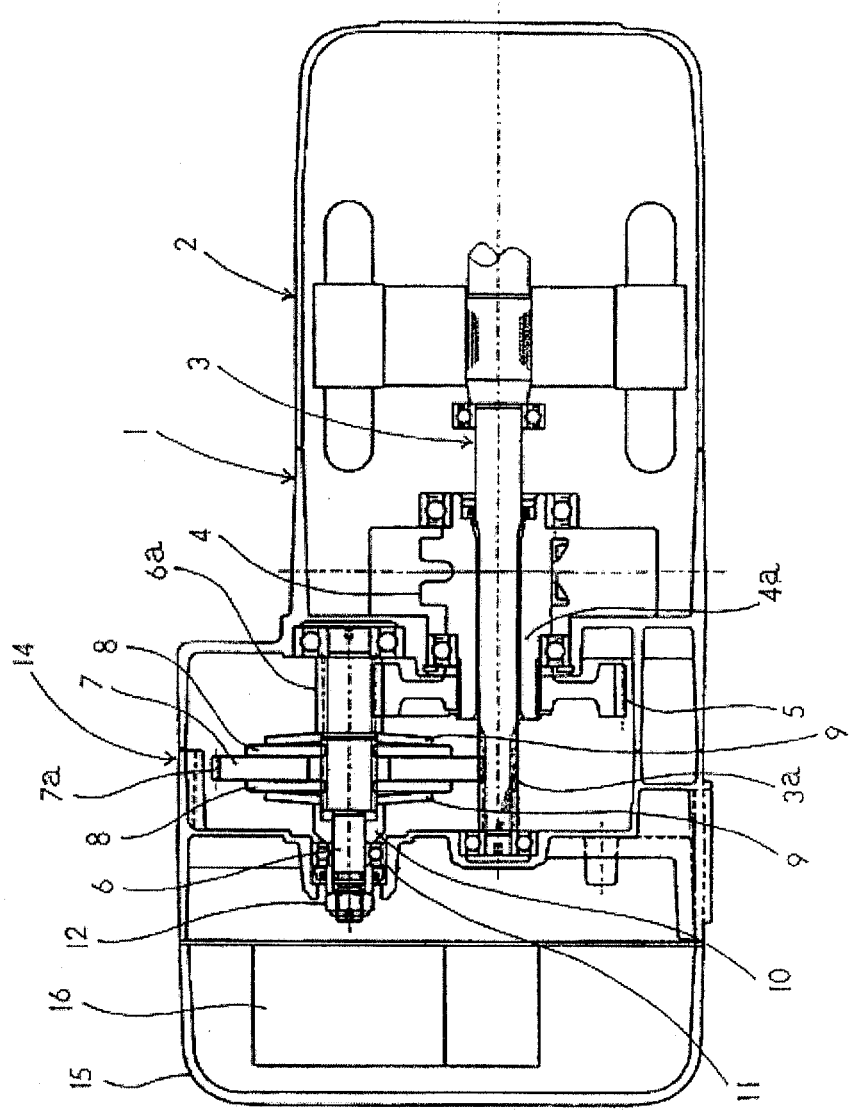
FIG. 1 is a cross sectional view of an electric chain block.
Figure 2:
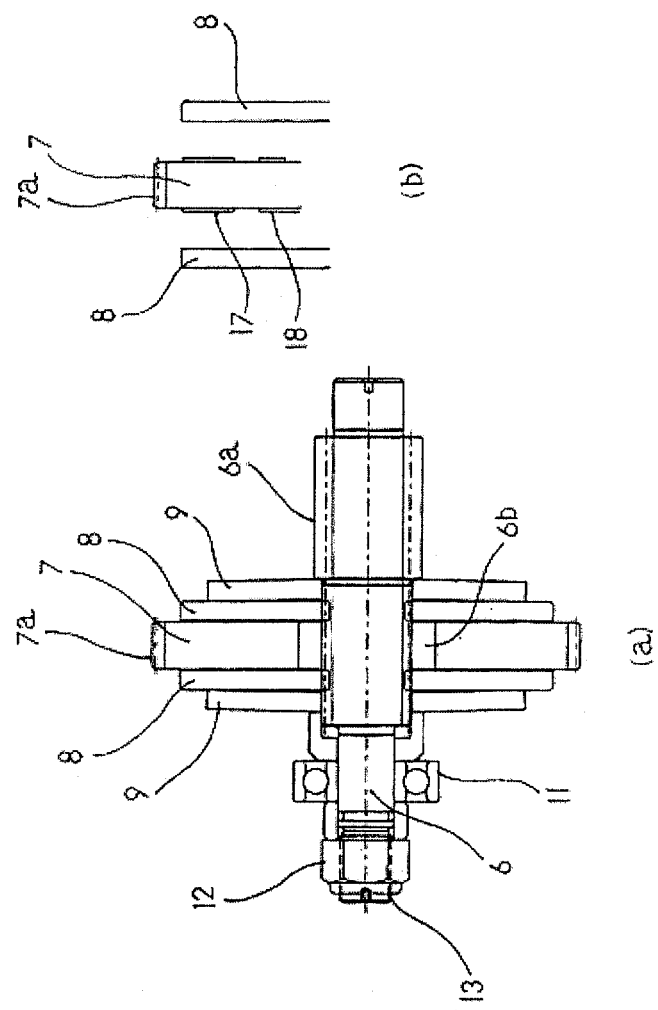
FIG. 2(a) is a cross sectional view of a friction clutch.
FIG. 2(b) is a partially enlarged view of it.

A wet type friction plate of the present invention will be described with reference to the figures.

In the figures, reference numeral 1 denotes an electric chain block main body, reference numeral 2 denotes a motor containing section, reference numeral 3 denotes a motor output shaft, reference numeral 3a denotes a pinion that is formed at the tip of the motor output shaft, reference numeral 4 denotes a load sheave, reference numeral 4a denotes a boss section of the load sheave 4, reference numeral 5 denotes a load gear which spline- or serration-couples with the load sheave boss section 4a, reference numeral 6 denotes a gear shaft having a gear 6a whose one end is intermeshed with the load gear 5, reference numeral 7 denotes a clutch plate borne by bush 6b of the gear shaft 6, reference numeral 7a denotes a gear that is intermeshed with the pinion 3a of the motor output shaft 3 and provided on the circumference of the clutch plate 7, reference numeral 8 denotes a rigger which presses on and contacts both sides of the clutch plate 7 and which is shaft-supported in a non-rotatable manner by the gear shaft 6, reference numeral 9 denotes a disc spring for biasing the rigger 8 to the sides of the clutch plate 7, reference numeral 10 denotes a disc spring presser, reference numeral 11 denotes a bearing of the gear shaft 6, reference numeral 12 denotes a nut for disc spring pressure control, and reference numeral 13 denotes a male Moreover, the ratio of the area which the paper based friction member occupies with respect to the sum of the area of the paper based friction member and the area of the carbon based friction member (hereinafter, referred to as the ratio of the paper section area) was obtained, and the most preferable range was checked.

The test results are indicated in Table 1.

In the table, the "slip setting value" is a minimum load at which the friction clutch has worked (slipped). Also, the value is represented with the magnification to the load rating, and is indicated using "W".

Example: If the slip setting value is 1.7-fold of the load rating, the slip setting value is indicated as slip setting value being 1.7 W.

TABLE 1

| ID Nos. of prototypes | Models | Distance from the center of the gear 2 to the center of the friction member (moment arm) mm | | Ratio of the moment arm of the paper section (%) paper/(carbon + paper) × 100 | Area per friction member segment (mm²) | | Ratio of the paper section area (%) paper/(carbon + paper) × 100 | Test result | |
|---|---|---|---|---|---|---|---|---|---|
| | | Carbon material | Paper material | | Carbon material | Paper material | | Cold test | Chattering |
| 81201 | DS | 42 | 42 | 50 | 441 | 441 | 50 | NG (0.5 W) | Good |
| 101101 | DS | 42 | 35 | 45 | 441 | 305 | 41 | NG (0.3 W) | Good |
| 101101-2 | DS | 42 | 31.75 | 43 | 441 | 152.5 | 26 | NG (0.3 W) | Good |
| 101101-3 | DS | 42 | 30.5 | 42 | 441 | 94.3 | 18 | NG (0.4 W) | Good |
| 10201 | FS | 57 | 39 | 41 | 993 | 615 | 38 | NG (0.2 W) | Good |
| 10203 | FS | 57 | 43.5 | 43 | 993 | 305 | 23 | NG (0.2 W) | Good |
| 10204 | FS | 57 | 39 | 41 | 993 | 307 | 24 | NG (0.1 W) | Good |
| 10205 | FS | 57 | 34.5 | 38 | 993 | 310 | 24 | Good (0.2 W) | Good |

In Table 1,
NG: Sudden, unexpected falling of the load occurred;
Inside parenthesis: Increase of the slip setting value.

screw. Reference numeral 14 denotes a speed reduction gear containing section, and reference numeral 15 denotes an electric equipment containing section for containing electric equipment 16. Reference numeral 17 denotes a CFRP based friction member which is pasted and fixed on the clutch plate or the rigger, and reference numeral 18 denotes a paper based friction member which is pasted and fixed on the clutch plate or the rigger.

Figure 3:
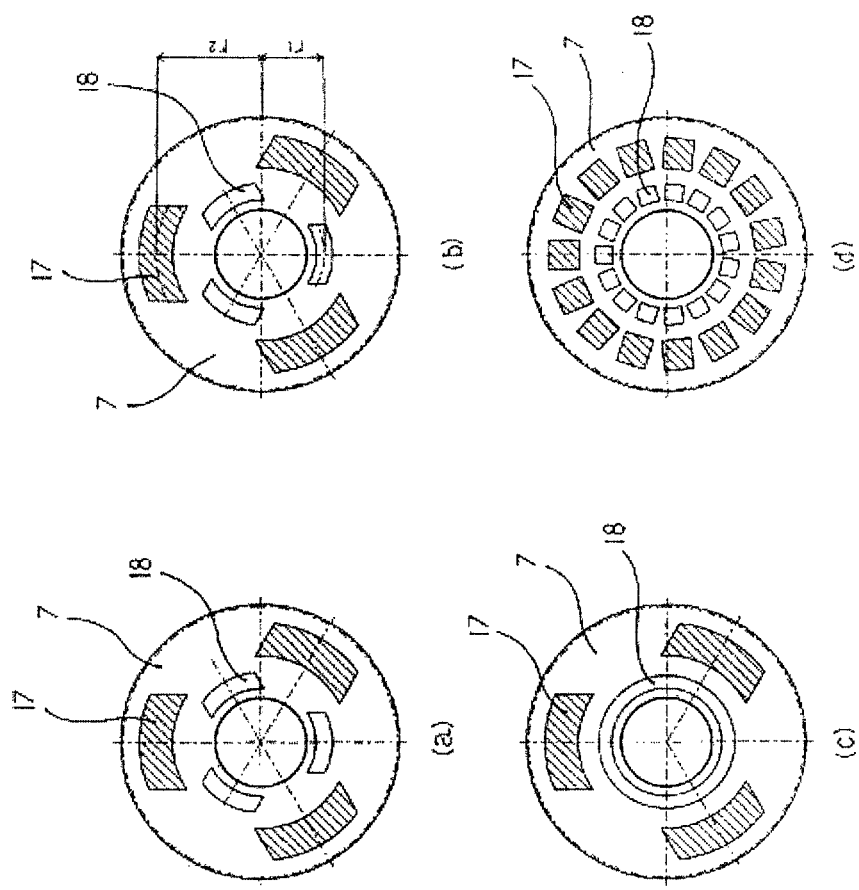
FIGS. 3(a)-(d) are plan views showing the respective modes in which friction members are pasted and fixed on a clutch plate.

According to the present embodiment, as shown in FIGS. 3 (a)-(d), the carbon based friction member 17, divided into the plural members, is pasted and fixed on the circumference of the clutch plate 7 in the circumferential direction, the divided or continuous paper based friction member 18 is pasted and fixed on the inner side of the clutch plate 7, and the transmission torque occupied by the paper friction member is smaller than that occupied by the carbon based friction member.

As shown in FIG. 3 (b), supposing the moment arm which is a distance from the center of the clutch plate 7 to the center of the paper based friction member 18 is $r_1$, and the moment arm which is a distance from the center of the clutch plate 7 to the center of the carbon based friction member 17 is $r_2$, then the ratio of the moment arm $r_1$ of the paper based friction member 18 and the sum of the moment arm $r_1$ and the moment arm $r_2$, which is a distance of the carbon based friction member 17, (hereinafter referred to as the ratio of the moment arm of the paper section) was obtained. A test was performed under a condition where the ratio of the moment arm of the paper section is in a range from 50% to 30%, and the most preferable range was checked.

As clearly understood from the Table 1, in the Identification Nos. 10201, 10203, 10204 and 10205, the increase of the slip setting value is 0.2 W or less, the slip setting value satisfies the determination criteria; however, in the Identification Nos. 10201, 10203, and 10204, the falling of the load was generated by a sudden, unexpected slip. On the other hand, in the Identification No. 10205, the increased amount of the slip setting value satisfies the determination criteria, and the falling of the load was not generated. Since the ratio of the moment arm of the paper section in the Identification No. 10205 is 38% and the ratio of the moment arm of the Identification No. 10204 is 41%, it is estimated that the uppermost value of the ratio of the moment arm of the paper section is 40%.

Moreover, when the ratio of the moment arm of the paper section is decreased, the slip setting value is also decreased and the falling of the load is not generated; however, "chattering" is generated by decreasing the paper based friction member. The present inventor confirmed that "chattering" is generated when the ratio of the moment arm of the paper section becomes 20% or less.

Moreover, the present inventor confirmed that the ratio of the paper section area is most preferably in the range from 5% to 45%.

Figure 4:
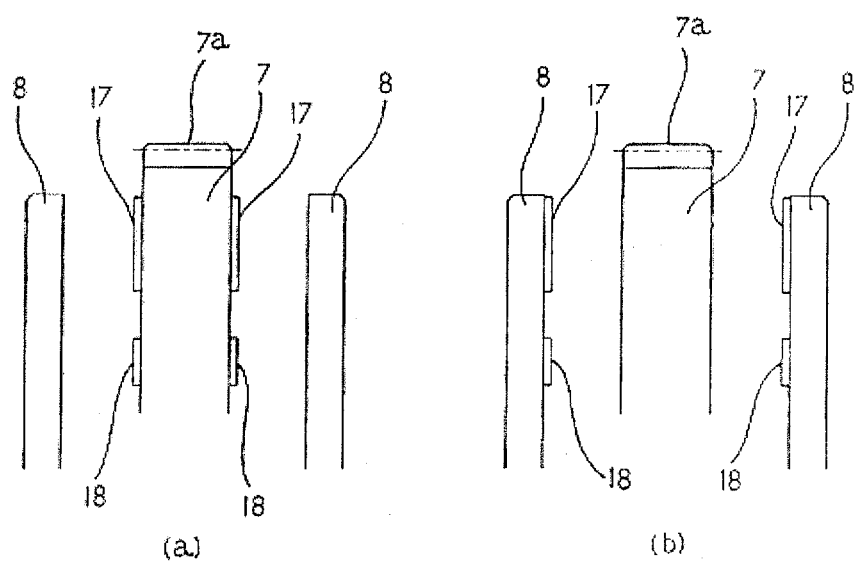
FIG. 4 is a cross sectional view showing an aspect in which friction members are pasted and fixed on a clutch plate and rigger.
Figure 4:
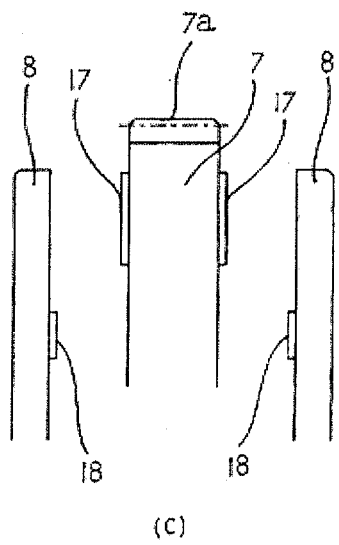

The present embodiment is explained as a mode in which a friction member is pasted and fixed on the clutch plate. However, as shown in FIG. 4 (b), the friction member may be pasted and fixed on the rigger. As shown in FIG. 4 (c), even in the case where the carbon based friction member is pasted and fixed on the clutch plate and even in the case where the paper based friction member is pasted and fixed on the rigger, the same effect as in the present embodiment is obtained.

Moreover, the present embodiment is explained as a mode in which the friction member is pasted and fixed on the clutch plate; however, it is capable of being applied to all of the wet type friction plate.

Since, with a wet type friction plate of the present invention, a sudden, unexpected slip is not generated at a lower temperature, a wet type friction plate of the present invention is particularly suitable for an electric chain block and a clutch of various types of transmissions and the like used at a lower temperature.

What is claimed is:

1. A wet type friction plate, comprising:
    a carbon based friction member divided into a plural number of carbon members in a circumferential direction of said friction plate and a paper based friction member, said carbon members and said paper based friction member being pasted and fixed on said friction plate,
    wherein said carbon members are provided on an outer side of said friction plate at a predetermined interval and said paper based friction member is provided on an inner side of said friction plate,
    wherein said paper based friction member has a moment arm $r_1$ which is a distance from a center of said friction plate to a center of said paper based friction member and said carbon based friction member has a moment arm $r_2$ which is a distance from said center of said friction plate to a center of said carbon based friction member,
    wherein a ratio of $r_1$ to a sum of $r_1+r_2$ is 0.38, and
    wherein a ratio of area occupied by said paper based friction member to a sum of areas occupied by said paper based friction member and said carbon based friction member is 0.24.

* * * * *